US006600128B2

United States Patent
Lai

(10) Patent No.: US 6,600,128 B2
(45) Date of Patent: Jul. 29, 2003

(54) FIRE ALARM DEVICE FOR LASER CUTTING/ENGRAVING MACHINE

(75) Inventor: Jin-Sheng Lai, Hsi-Chih (TW)

(73) Assignee: Great Computer Corp., Taipei Hsien (TW)

( * ) Notice: Subject to any disclaimer, the term of this patent is extended or adjusted under 35 U.S.C. 154(b) by 46 days.

(21) Appl. No.: 10/005,320

(22) Filed: Dec. 7, 2001

(65) Prior Publication Data

US 2003/0106880 A1 Jun. 12, 2003

(51) Int. Cl.[7] .............................................. B23K 26/00
(52) U.S. Cl. ................ 219/121.6; 219/121.83
(58) Field of Search .................. 219/121.6, 121.61, 219/121.62, 121.67, 121.68, 121.69, 121.71, 121.83

(56) References Cited

U.S. PATENT DOCUMENTS 4,575,610 A * 3/1986 Gavin 6,353,203 B1 * 3/2002 Hokodate et al.
6,476,352 B2 * 11/2002 Aleshin

* cited by examiner

Primary Examiner—Samuel M. Heinrich
(74) Attorney, Agent, or Firm—Varndell & Varndell, PLLC

(57) ABSTRACT

An alarm device for a laser cutting/engraving machine, it provides on the main body of the cutting/engraving machine an air blower set, a fire source detector, an alarm means and an alarm control system etc.; an air outlet of the air blower set is located on a cutting/engraving platform, an air pressure sensor provided in an air pipe is connected to the alarm control system, thereby, heat, waste gas and waste material produced by the cutting/engraving machine can be taken off effectively to prevent generating of a tongue of flame. The fire source detector is provided at a suitable position on the cutting/engraving platform connecting with the alarm control system for detecting generating of a fire source, and warns the operator in time, thereby, an excellent effect of fire proofing and warning can be achieved, and this can increase safety as well as practicality in use.

5 Claims, 5 Drawing Sheets

FIRE ALARM DEVICE FOR LASER CUTTING/ENGRAVING MACHINE

BACKGROUND OF THE INVENTION

1. Field of the Invention

The present invention is related to an alarm device for a laser cutting/engraving machine, and especially to such a structure with a fire source detector able to detect fire during cutting/engraving a workpiece, it suits various laser cutting/engraving machines or the like.

2. Description of the Prior Art

Since laser cutting/engraving machines of high quality are widely used, dangerous combustion has been induced by heat generated during cutting/engraving workpieces, this has been always paid high attention to by manufacturers and users, thereby various laser cutting/engraving machines have been developed.

However, most conventional laser cutting/engraving machines can not overcome the defect of generating high temperature during cutting/engraving; when they are used to cut/engrave materials with lower ignition points, such as plastic or rubber etc., large heat may be generated during cutting/engraving, workpieces will be burned, and even fire disaster may be induced; thereby, when laser cutting/engraving machines are used to carve materials with lower ignition points, danger is increased, and they are not desired devices.

In view of this, the inventor of the present invention studied hard and developed the present invention in consideration of the safety in operation of laser cutting/engraving to increase the scope of material for cutting/engraving by laser cutting/engraving machines.

SUMMARY OF THE INVENTION

The primary object of the present invention is to provide an alarm device for a laser cutting/engraving machine, it is provided with a fire source detector and an alarm means having the effect of detecting fire source to emit an alarm, thereby, safety of the laser cutting/engraving machine are increased.

Another object of the present invention is to provide an alarm device for a laser cutting/engraving machine, wherein, by providing an air blower set, heat energy and gas generated during laser processing can be extinguished, and an effect of preventing fire sources can be obtained, thereby, practicality of the laser cutting/engraving machine can be increased.

To achieve the above stated objects, the present invention provides on the main body of the cutting/engraving machine an air blower set, a fire source detector, an alarm means and an alarm control system, an air outlet of the air blower set is located on a cutting/engraving platform, an air pressure sensor provided in an air pipe is connected to the alarm control system; thereby, heat, waste gas and waste material produced by the cutting/engraving machine can be taken off effectively to prevent generating of a tongue of flame. The fire source detector is provided at a suitable position on the cutting/engraving platform connecting with the alarm control system for detecting generating of a fire source, and warns the operator in time, thereby, an excellent effect of fire proofing and warning can be achieved, and this can increase safety as well as practicality in use.

The present invention will be apparent in its structure and characteristics after reading the detailed description of the preferred embodiment thereof in reference to the accompanying drawings.

DETAILED DESCRIPTION OF THE PREFERRED EMBODIMENT

Figure 1:
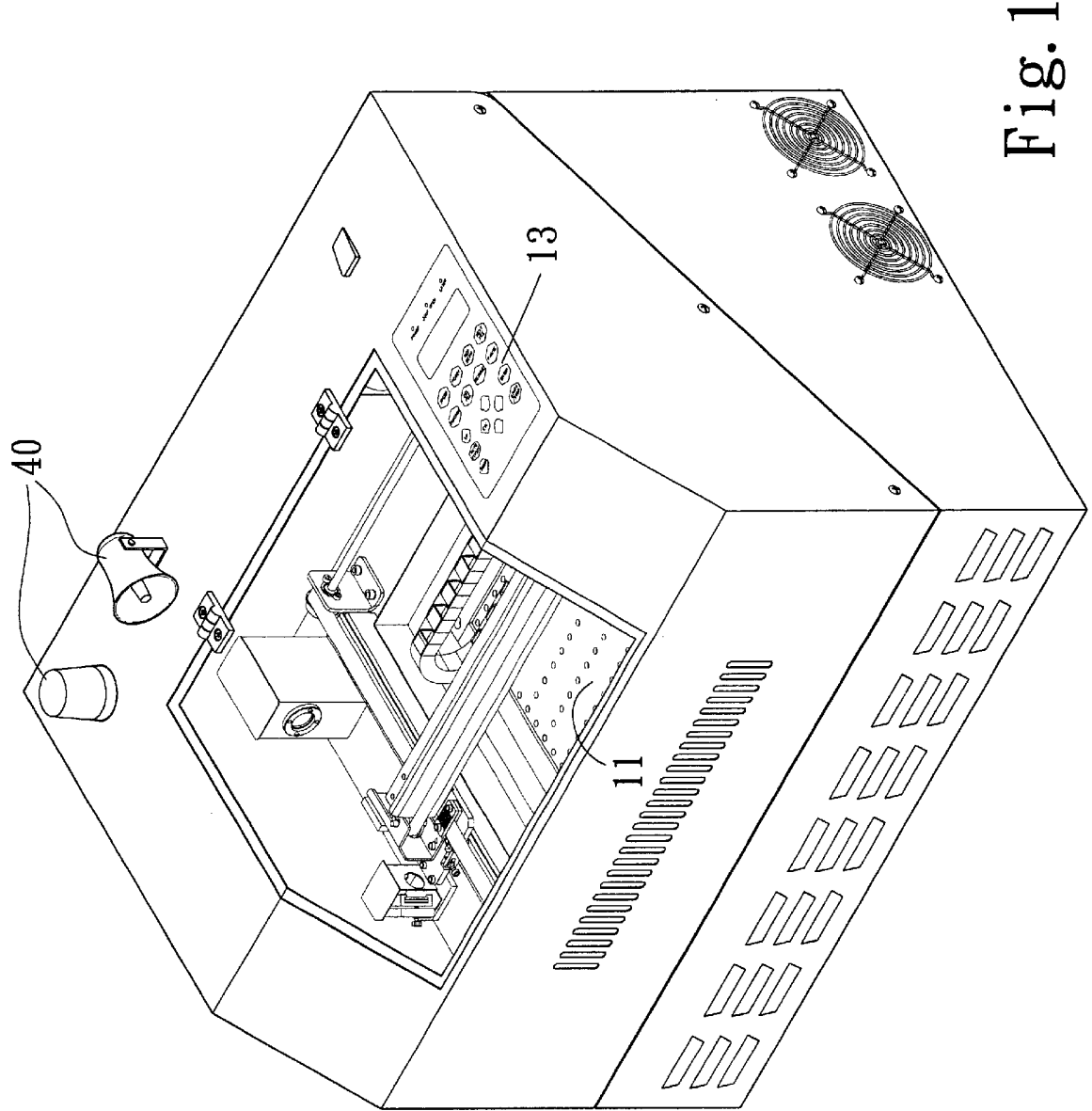
FIG. 1 is a perspective view of an embodiment of the present invention.
Figure 2:
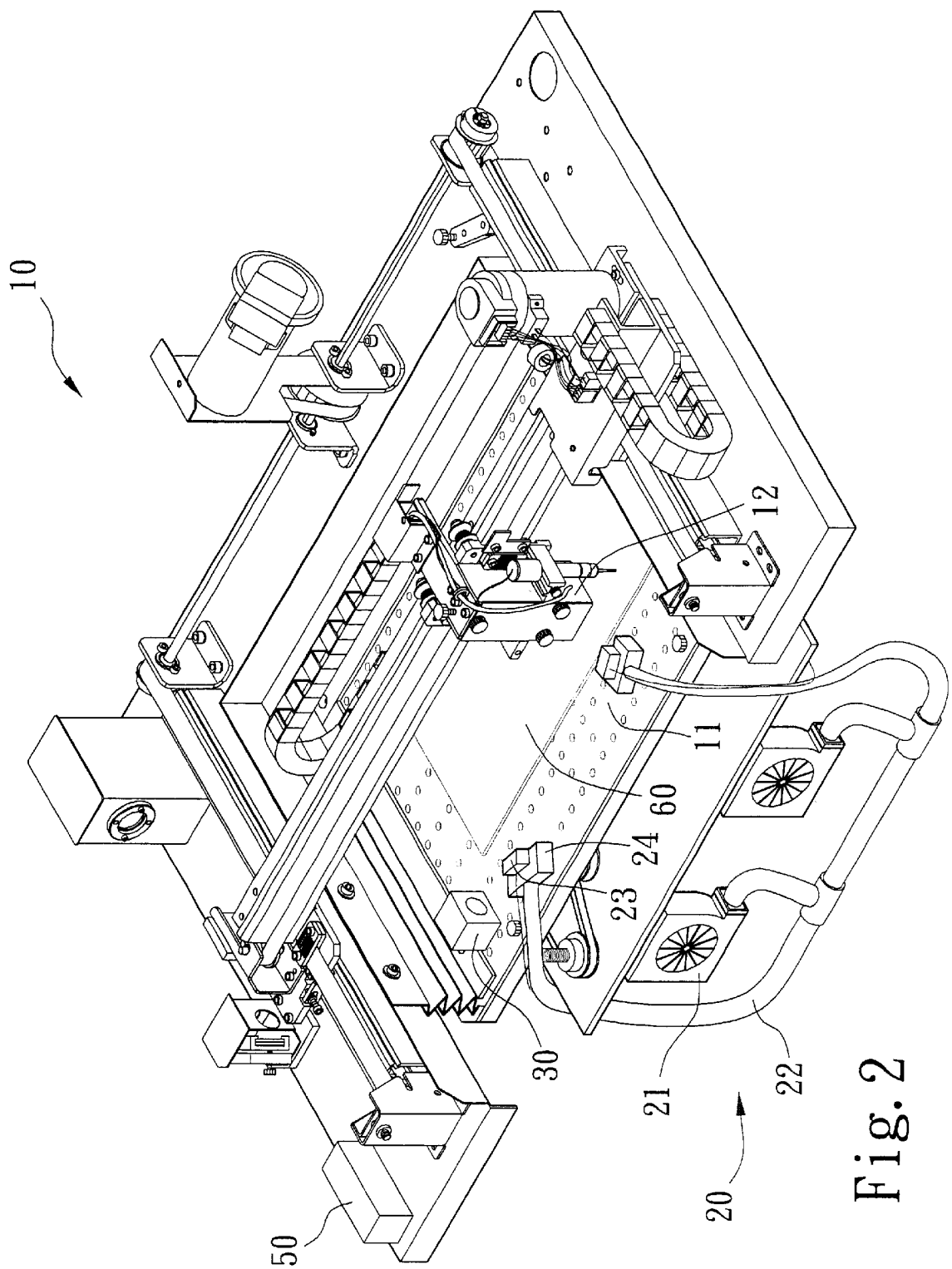
FIG. 2 is a perspective schematic view showing the structure of the embodiment of the present invention.

Referring firstly to FIGS. 1, 2, the alarm device for a laser cutting/engraving machine of the present invention is comprised of a main body of the cutting/engraving machine 10, an air blower set 20, a fire source detector 30, an alarm means 40 and an alarm control system 50 etc.

The cutting/engraving machine 10 is provided thereon with a cutting/engraving platform 11 and a laser pen seat 12; wherein, the cutting/engraving platform 11 is provided for mounting the fire source detector 30, while the laser pen seat 12 is controlled by a laser control system 13.

The air blower set 20 is mounted on the cutting/engraving machine 10 and is provided with a plurality of air blowers 21 connected by an air pipe 22 to send in large amount of air outside, thereby to prevent the cut portion of a workpiece 60 to reach its ignition temperature. The air pipe 22 is provided thereon with an air pressure sensor 23 provided to sense air entering the main body of the cutting/engraving machine 10 and to transmit back signals to the alarm control system 50.

The fire source detector 30 is a sensor for sensing infrared ray, smoke or specific gas, and is connected to the alarm control system 50 to sense generation of a fire source.

The alarm means 40 is connected to the alarm control system 50 to output an alarm signal such as a sound or light.

The alarm control system 50 is a programmable logic control system circuit, and is used to process the signal transmitting back from detectors and to decide whether there is fire and whether a signal is to output for the alarm means 40.

With the alarm device for a laser cutting/engraving machine formed by combination of the above elements on the cutting/engraving machine 10, referring to FIG. 2, in the present invention, the air blower set 20 is mounted on the cutting/engraving machine 10, an air outlet 24 of the air blower set 20 is located on the cutting/engraving platform 11, the air pressure sensor 23 provided in the air pipe 22 is connected to the alarm control system 50. The fire source detector 30 is provided at a suitable position on the cutting/engraving platform 11 connecting with the alarm control system 50. The alarm control system 50 is provided at a suitable position on the cutting/engraving machine 10 to connect with the laser control system 13; while the alarm control system 50 is further connected with the alarm means 40 provided on the cutting/engraving machine 10. In this way, the combination of the present invention is completed.

Figure 3A:
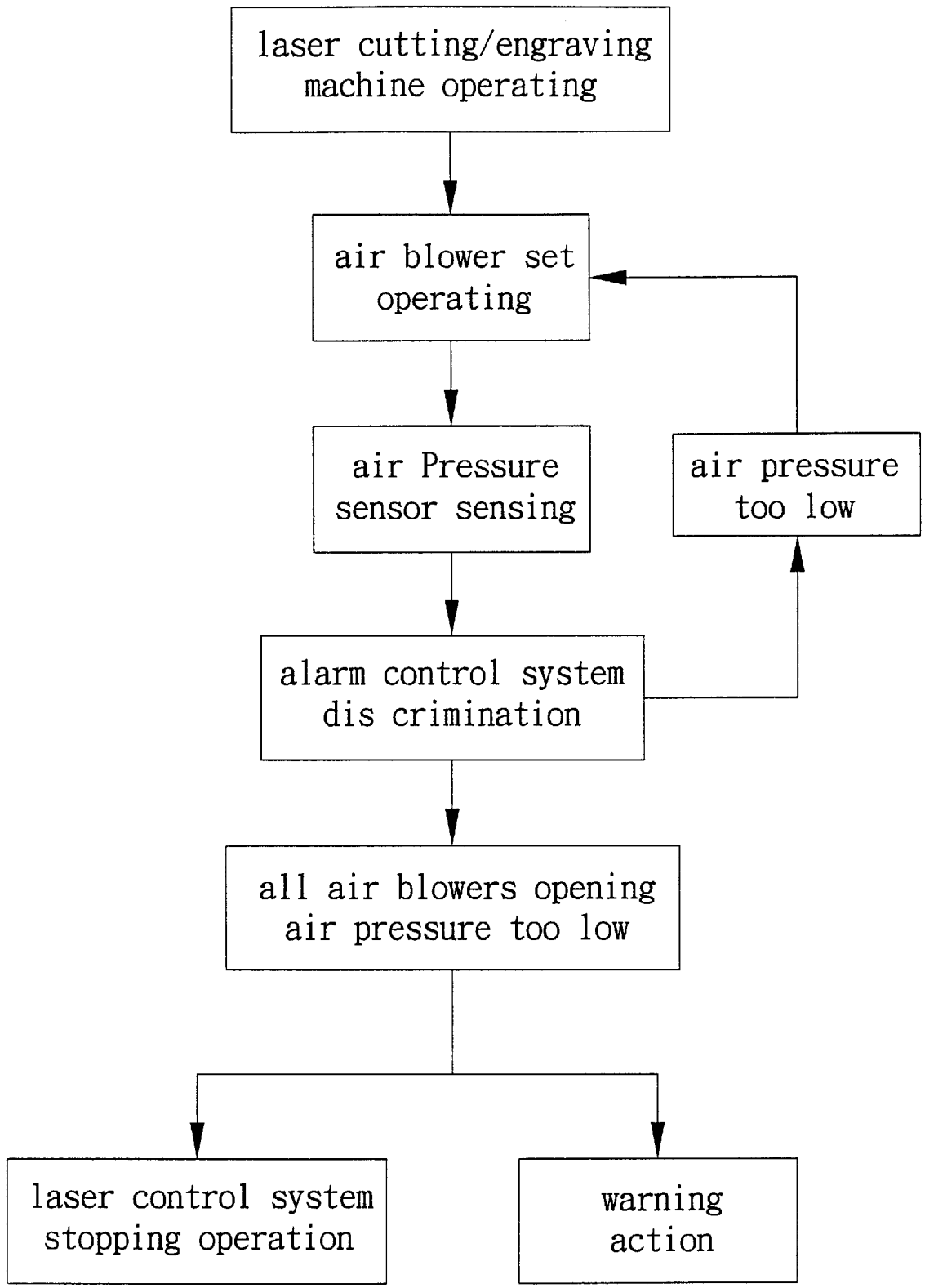
FIG. 3a is a process chart of the air blower of the embodiment of the present invention.
Figure 3B:
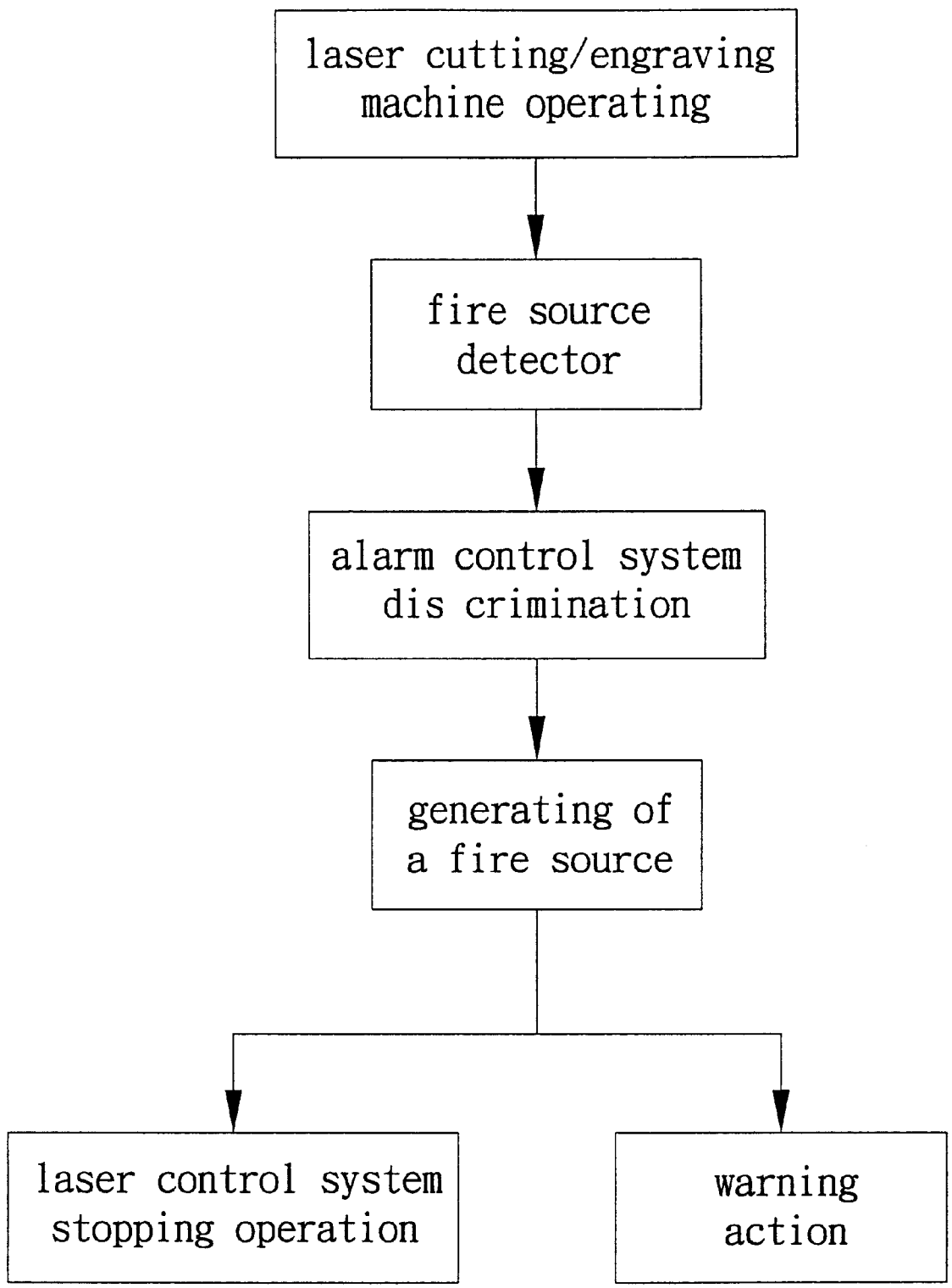
FIG. 3b is a process chart of the fire source detector of the embodiment of the present invention.
Figure 4:
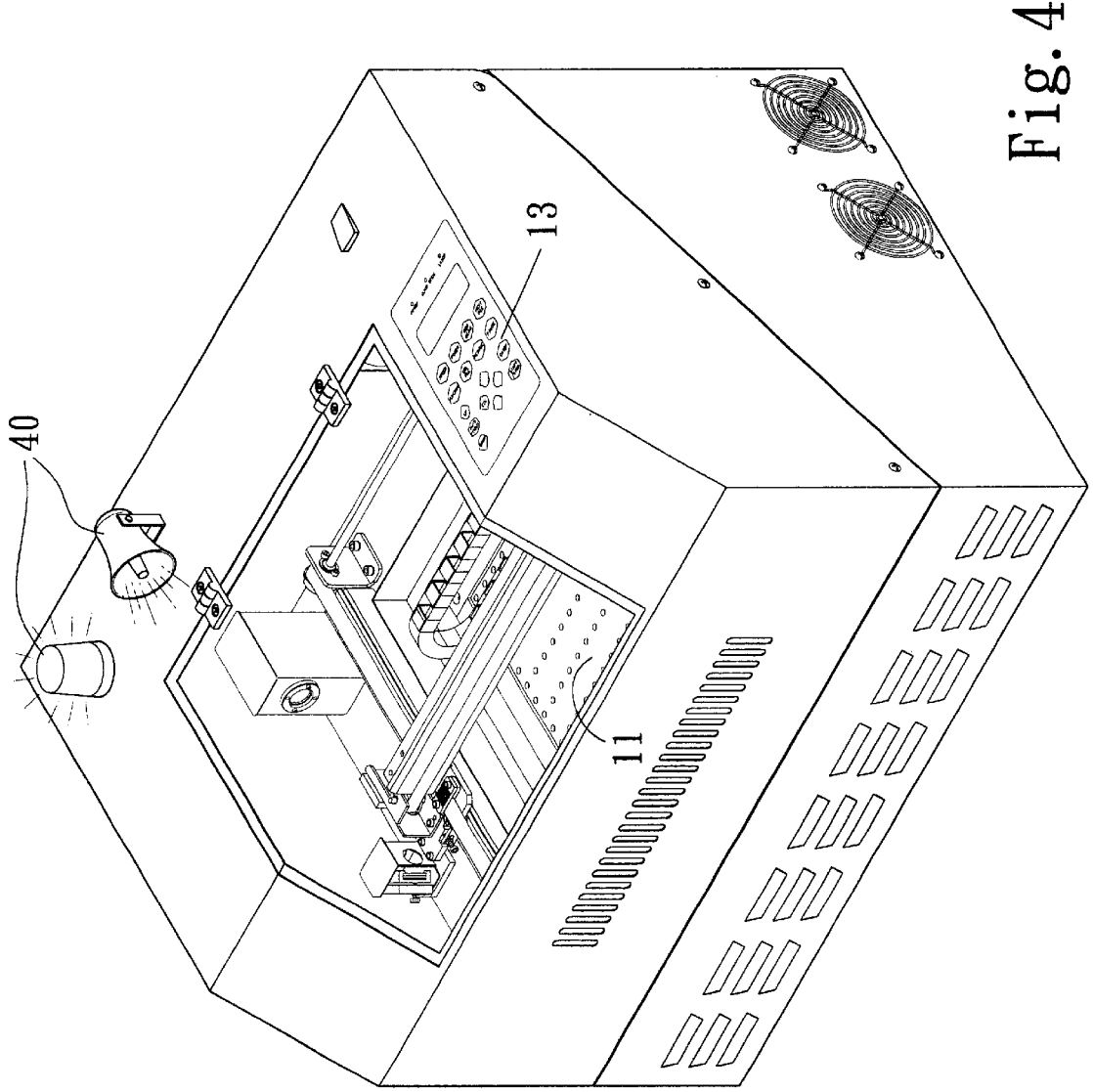
FIG. 4 is a perspective schematic view showing the appearance of the embodiment of the present invention.

Referring to FIGS. 3a and 4, when in operation of the present invention, in the same mode as stated before, after the alarm device for the laser cutting/engraving machine is assembled, the workpiece 60 is fixed on the cutting/engraving platform 11, when the laser pen seat 12 of the cutting/engraving machine 10 is operated, the alarm control system 50 is synchronically controlled to make the first of the air blowers 21 rotate, thereby air can take heat and combustible gas off during cutting/engraving, at this time, the air pressure sensor 23 checks out air pressure in the air pipe 22. When the air pressure is too low, the alarm control system 50 is immediately controlled to make the second of the air blowers 21 rotate to raise air pressure and air flow; when all the air blowers 21 are rotated, and the air pressure is still too low, the alarm control system 50 immediately generates a signal to activate the alarm means 40 to emit sound or flashing, and transmit a signal to the laser control system 13 to stop operation of the laser pen seat 12, thereby, the operator is warned to avoid conflagration.

Accordingly, the present invention has the following advantages:
1. The present invention can automatically detect generating of a fire source and warn the operator in time for dealing with, this can increase safety of use.
2. The present invention is provided with an air blower set to take off heat, waste gas and waste material produced during cutting/engraving, hence the workpiece is prevented from burning, and safety as well as practicality in avoiding burning of the workpiece in use are obtained.
3. The present invention can use different fire source detectors or have different parameters set for the alarm control system in pursuance of the material of the workpiece; hence practicality in use can be obtained.

In conclusion, the present invention not only can get rid of the defects resided in the conventional laser cutting/engraving machines, but also can get an effect of preventing generating of a fire source and making warning, it can be used for workpieces of various materials, thereby, practicality in use of the whole laser cutting/engraving machine can be largely increased. The present invention can thereby suit various laser cutting/engraving machines.

What is claimed is:

1. An alarm device for a laser cutting/engraving machine, said device comprises a main body of said cutting/engraving machine, an air blower set, a fire source detector, an alarm means and an alarm control system, wherein:

said cutting/engraving machine is provided thereon with a cutting/engraving platform and a laser pen seat, said cutting/engraving platform is provided for mounting said fire source detector, while said laser pen seat is controlled by a laser control system;

said air blower set is mounted on said cutting/engraving machine and is provided with a plurality of air blowers connected by an air pipe to send in large amount of air outside, thereby to prevent the cut portion of a workpiece to reach its ignition temperature;

said fire source detector is a sensor, and is connected to said alarm control system to sense generating of a fire source;

said alarm means is connected to said alarm control system to output an alarm signal; and said alarm control system is a programmable logic control system circuit, and is used to process the signal transmitting back from a plurality of detectors and to decide whether there is fire and whether a signal is to output for said alarm means.

2. An alarm device for a laser cutting/engraving machine as in claim 1, wherein, an air pipe provided for said air blower set is provided thereon with an air pressure sensor to sense air entering the main body of said cutting/engraving machine and to transmit back signals to said alarm control system.

3. An alarm device for a laser cutting/engraving machine as in claim 1, wherein, said fire source detector is a sensor for sensing infrared ray, smoke or specific gas.

4. An alarm device for a laser cutting/engraving machine as in claim 1, wherein, said alarm means is a device used to output a sound or light.

5. An alarm device for a laser cutting/engraving machine as in claim 1, wherein, said alarm control system is adapted to different operational programs in pursuance of the material of said workpiece, thereby it is adapted to various materials.

* * * * *